United States Patent
Gornick

(10) Patent No.: US 11,612,132 B2
(45) Date of Patent: Mar. 28, 2023

(54) PORTABLE PATIO FOR SMALL PET ELIMINATION

(71) Applicant: Melanie Gornick, Bloomington, MN (US)

(72) Inventor: Melanie Gornick, Bloomington, MN (US)

(73) Assignee: Melanie Gornick, Bloomington, MN (US)

( * ) Notice: Subject to any disclaimer, the term of this patent is extended or adjusted under 35 U.S.C. 154(b) by 60 days.

(21) Appl. No.: 17/362,961

(22) Filed: Jun. 29, 2021

(65) Prior Publication Data

US 2021/0400907 A1 Dec. 30, 2021

Related U.S. Application Data

(60) Provisional application No. 63/102,750, filed on Jun. 29, 2020.

(51) Int. Cl.
*A01K 1/01* (2006.01)

(52) U.S. Cl.
CPC .......... *A01K 1/0125* (2013.01); *A01K 1/0103* (2013.01)

(58) Field of Classification Search
CPC ... A01K 1/0125; A01K 1/0103; A01K 1/0114
USPC .................................................. 119/502, 168
See application file for complete search history.

(56) References Cited

U.S. PATENT DOCUMENTS

| | | | | |
|---|---|---|---|---|
| 2,671,427 | A * | 3/1954 | Fell | A01K 1/0107 119/166 |
| 8,539,911 | B1 * | 9/2013 | Landrum | A01K 1/033 119/168 |
| 8,656,863 | B2 | 2/2014 | Havluciyan | |
| D702,895 | S * | 4/2014 | Mishan | D30/161 |
| 9,750,224 | B2 * | 9/2017 | Kupka | A01K 1/035 |
| 2008/0236510 | A1 * | 10/2008 | Silverman | A01K 31/08 206/509 |
| 2008/0251026 | A1 * | 10/2008 | Bell | A01K 1/0125 119/168 |
| 2010/0122662 | A1 * | 5/2010 | Kennington | A01K 1/0114 422/291 |
| 2010/0300371 | A1 * | 12/2010 | Oeltjen | A01K 1/034 119/501 |
| 2010/0307425 | A1 * | 12/2010 | Illman | A01K 1/03 119/499 |
| 2012/0227675 | A1 * | 9/2012 | Link | A01K 1/0005 119/474 |
| 2013/0152867 | A1 * | 6/2013 | Kaneda | A01K 1/034 119/502 |
| 2021/0169036 | A1 * | 6/2021 | Rachel | A01K 1/0125 |

* cited by examiner

*Primary Examiner* — Brady W Frazier
*Assistant Examiner* — Zoe Tam Tran
(74) *Attorney, Agent, or Firm* — Michael A. Bondi; Moss & Barnett

(57) ABSTRACT

An illustrated view of a piddle patio for in care and maintenance of a small pet is presented. The piddle patio allows small pet owners the option to take their pets onto condominium, hotel and apartment balconies to comfortably eliminate, thereby avoiding the hassle of walking through a lobby, taking elevators and dealing with security. The piddle patio also allows those who are high-risk for contracting Covid the ability to avoid human contact and remain quarantined while still allowing their pets to go outside and enjoy fresh air in their own mini dog park.

13 Claims, 7 Drawing Sheets

PORTABLE PATIO FOR SMALL PET ELIMINATION

PRIORITY

This utility application claims the benefit of U.S. Provisional Patent Application No. 63/102,750, filed on Jun. 29, 2020, the entirety is hereby incorporated by reference.

FIELD OF THE INVENTION

This invention relates to portable patios. More particularly, it relates to a portable patio for small pets.

BACKGROUND

A patio is an outdoor space generally used for dining or recreation that adjoins a residence and is typically paved.

Patios are most commonly paved with concrete or stone slabs (also known as paving flags). They can also be created using bricks, block paving, tiles, cobbles, or gravel. Other kinds of patio materials these days include alumna-wood, aluminum, acrylic, and glass.

Patio options include concrete, stamped concrete, and aggregate concrete. Stamped concrete costs more, is known to be slippery, requires being resealed, and des typically fade in time. Aggregate concrete uses stones exposed giving its own style.

A pet, or companion animal, is an animal kept primarily for a person's company or entertainment rather than as a working animal, livestock or a laboratory animal, Popular pets are often considered to have attractive appearances, intelligence and relatable personalities, but some pets may be taken in on an altruistic basis (such as a stray animal) and accepted by the owner regardless of these characteristics.

Two of the most popular pets are dogs and cats; the technical term for a cat lover s an ailurophile and a dog lover a cynophile. Other animals commonly kept include: rabbits; ferrets; pigs; rodents, such as gerbils, chinchillas, rats, mice and guinea pigs; avian pets, such as parrots, passerines and fowls; reptile pets, such as turtles, alligators, crocodiles, lizards and snakes; aquatic pets, such as fish, freshwater and saltwater snails, amphibians like frogs and salamanders; and arthropod pets, such as tarantulas and hermit crabs. Small pets may be grouped together as pocket pets, while the equine and bovine group include the largest companion animals.

Pets provide their owners (or "guardians") both physical and emotional benefits. Walking a dog can provide both the human and the dog with exercise, fresh air and social interaction. Pets can give companionship to people who are living alone or elderly adults who do not have adequate social interaction with other people. There is a medically approved class of therapy animals, mostly dogs or cats, that are brought to visit confined humans, such as children in hospitals or elders in nursing homes. Pet therapy utilizes trained animals and handlers to achieve specific physical, social, cognitive or emotional goals with patients.

In many metro areas during the height of Covid small pets were confined to the same small areas as their owners on top of not being able to take walks (at least long walks due to virus quarantine & curfew requirements), also many small pet owners are older people who should be avoiding close contact to others which is typically unavoidable in multi-housing complexes.

In light of the foregoing, it would be desirable to devise patio apparatus that provided more flexibility in care and maintenance of a small pet. It would be further advantageous if the apparatus was convenient, portable and cost effective.

DETAILED DESCRIPTION

Figure 1A:
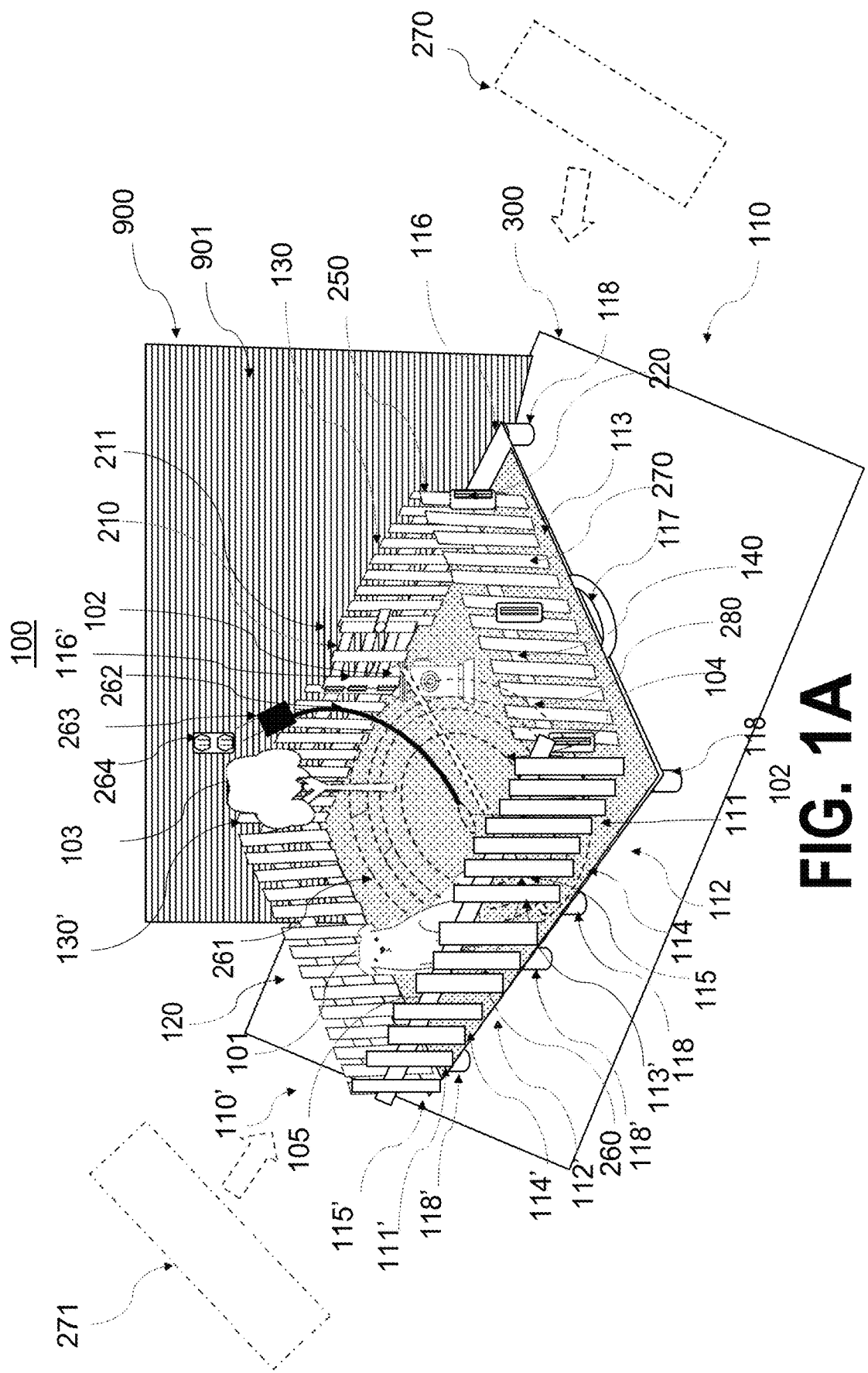
FIG. 1A is an illustrated view of an exemplary piddle patio.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
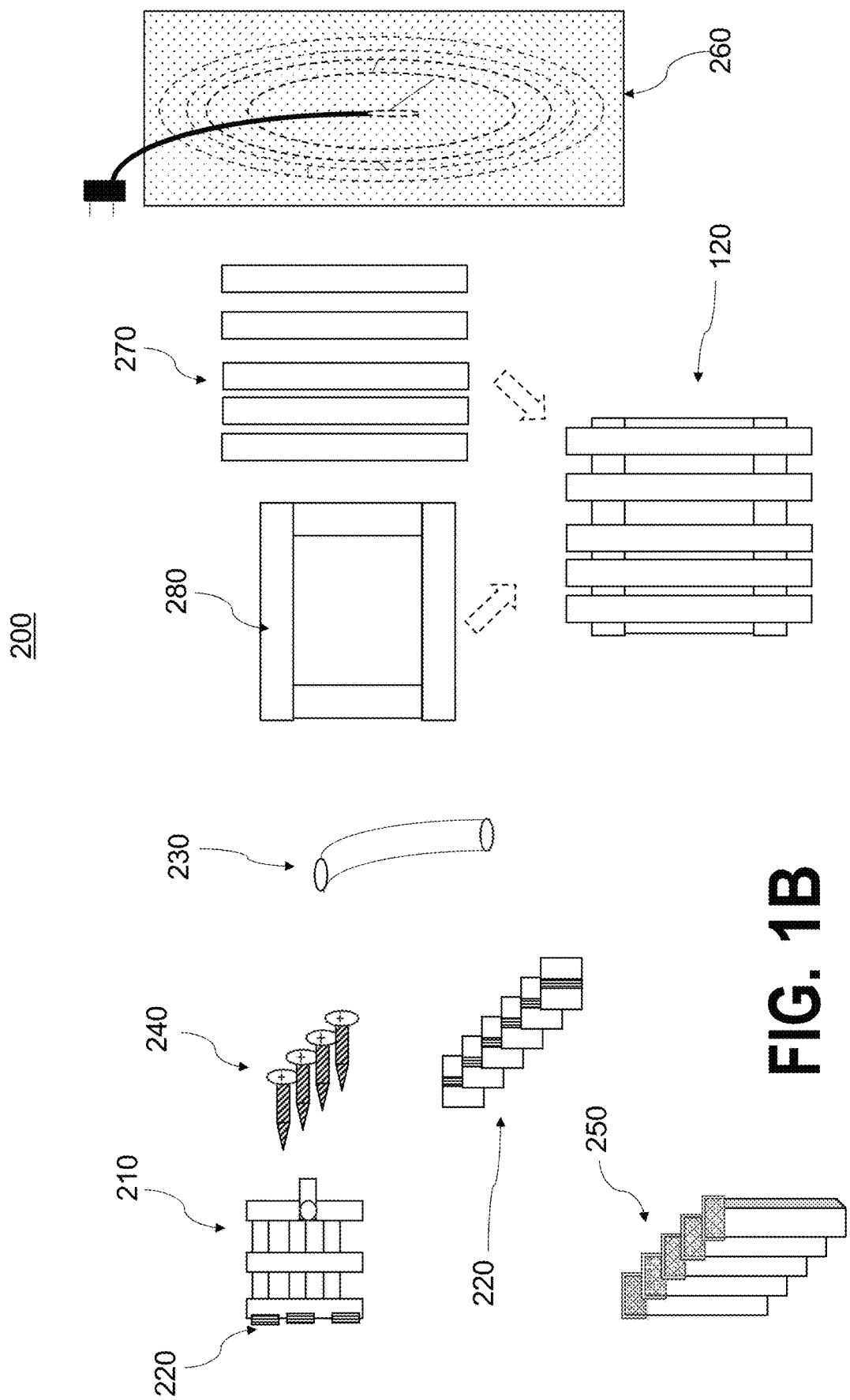
FIG. 1B is an illustrated kit to construct the piddle patio shown in FIG. 1A.
Figure 1C:
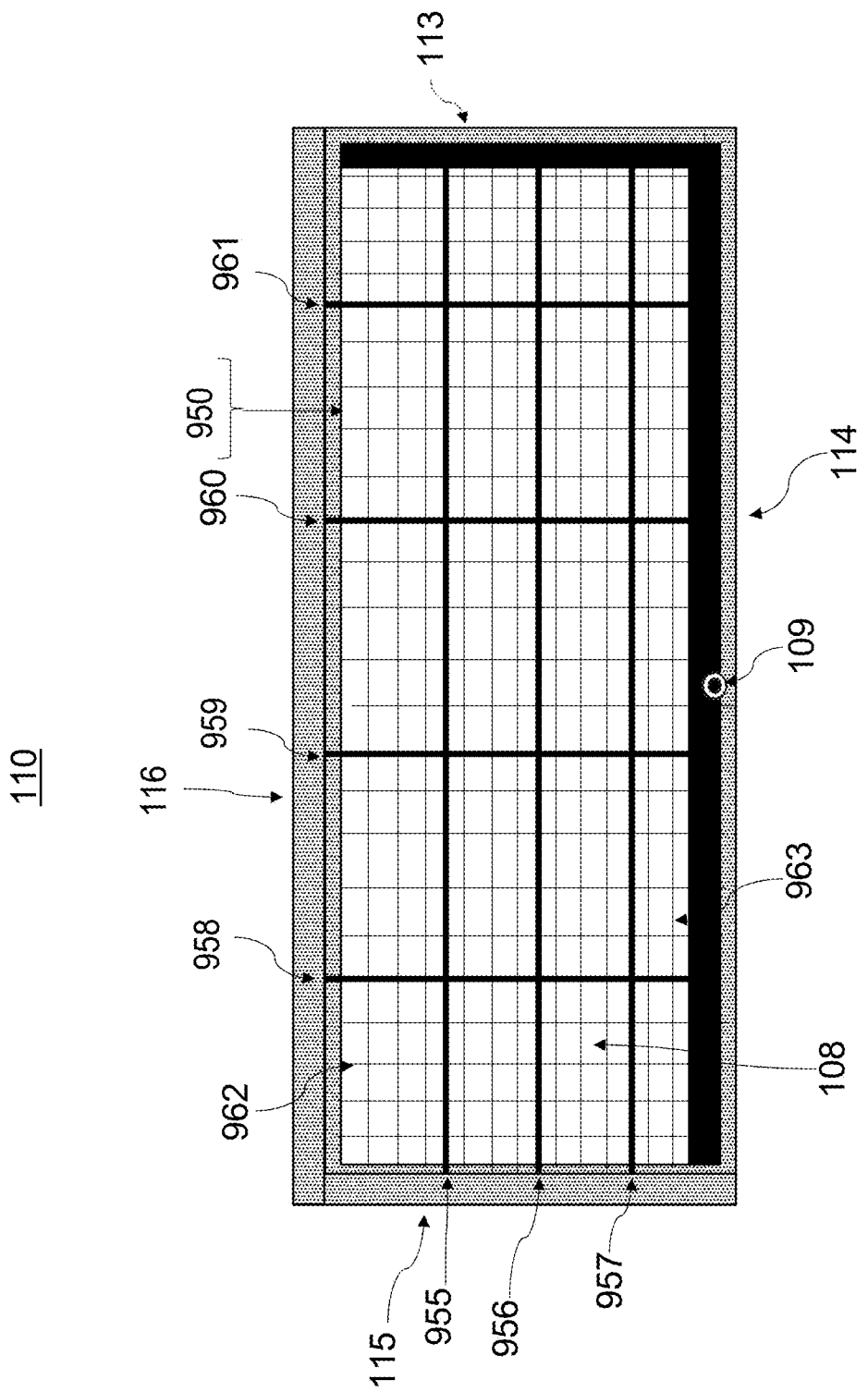
FIG. 1C is an illustrated view of a base of the piddle patio shown in FIG. 1A.

Referring to FIG. 1A, FIG. 1B and FIG. 1C, an illustrated view of a piddle patio 100 for in care and maintenance of a small pet is presented. The piddle patio 100 allows small pet owners the option to take their pets onto condominium, hotel and apartment balconies to comfortably eliminate, thereby avoiding the hassle of walking through a lobby, taking elevators and dealing with security. The piddle patio 100 also allows those who are high-risk for contracting Covid the ability to avoid human contact and remain quarantined while still allowing their pets to go outside and enjoy fresh air in their own mini dog park.

The piddle patio 100 is preferably a rectangular shape when unfolded, however other shapes are hereby contemplated, including, but not limited to, oval, round, square, etc. When unfolded, the piddle patio 100 is preferably forty-eight inches (48") in width, however other widths are hereby contemplated, including but not limited to, thirty-six inches (36"), sixty inches (60"), etc. When unfolded, the piddle patio 100 is preferably ninety-six inches (96") in length, however other lengths are hereby contemplated, including but not limited to, seventy-two inches (72"), one-hundred twenty inches (120"), etc.

The piddle patio 100 is preferably a square shape when folded, however other shapes are hereby contemplated, including, but not limited to, oval, round, rectangular, etc. When unfolded, the piddle patio 100 is preferably forty-eight inches (48") in width, however other widths are hereby contemplated, including but not limited to, thirty-six inches (36"), sixty inches (60"), etc. When unfolded, the piddle patio 100 is preferably forty-eight inches (48") in length, however other lengths are hereby contemplated, including but not limited to, thirty-six inches (36"), sixty inches (60"), etc. When folded, the piddle patio 100 is also called a case which is further described and shown in FIG. 4.

The piddle patio 100 has two bases 110, 110', a plurality of fence panels 120, 130, 140, a gate 210, shown in FIG. 1B, a plurality of hinges 220, a drain hose 230 shown in FIG. 1B, a plurality of coupling devices 240, a plurality of posts 250 and a turf 260 shown in FIG. 1B.

Further, but not components of the piddle patio 100 are a pet 101, such as a dog (as shown), a cat, etc., a fire hydrant 102 or other accessories, a tree 103 and a refuse receptacle 104.

Each of the bases 110, 110' has a top 111, 111', a bottom 112, 112', four sides 113, 114, 115, 116, 113', 114', 115' 116'. One or more of the sides 113, 114, 115, 116, 113', 114', 115' 116' of the first of the bases 110 may have one of the handles 117. The handles 117 is useful when the piddle patio 110 is folded and is to be carried or toted for storage or movement to another location.

Each of the bottoms 112, 112' of each of the bases 110, 110' has a plurality of footings 118, 118'. The footings 118, 118' allow for the piddle patio 100 to be above a ground 300. The turf 260 is removably coupled to the top 111, 111' of the bases 110, 110'.

The turf 260 has a heating coil 261, an electrical cord 262 and an electrical plug 263. The heating coil 261 provides heat to the turf 260 and thus keeps the turf 260 warm and free of ice. The heating coil 261 is powered by coupling the electrical plug 263 to a power source 264. The power is transferred through the electrical cord 262 to the heating coil 261

When the piddle patio 100 is unfolded, a third of the sides 115 of the first of the bases 110 is coupled to the first of the sides 113' of second of the bases 110', where the bases 110, 110' are slanted towards the coupled bases 110, 110' forming a channel 105, such that any liquid, such as rain, urine, etc. are flow to through the channel 105 to allow for drainage.

Figure 3A:
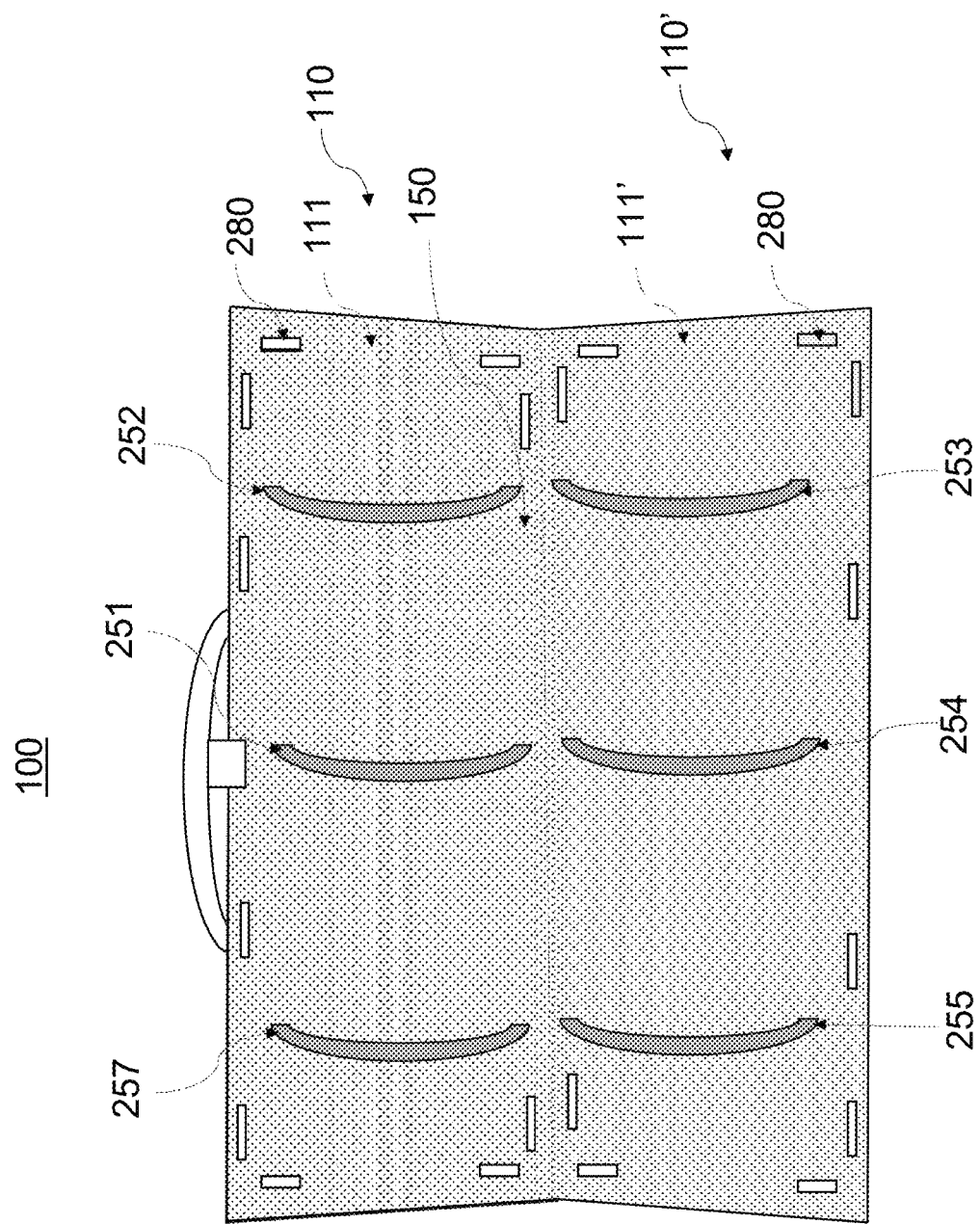
FIG. 3A is an illustrated view of a top of the piddle patio shown in FIG. 1A.
Figure 3B:
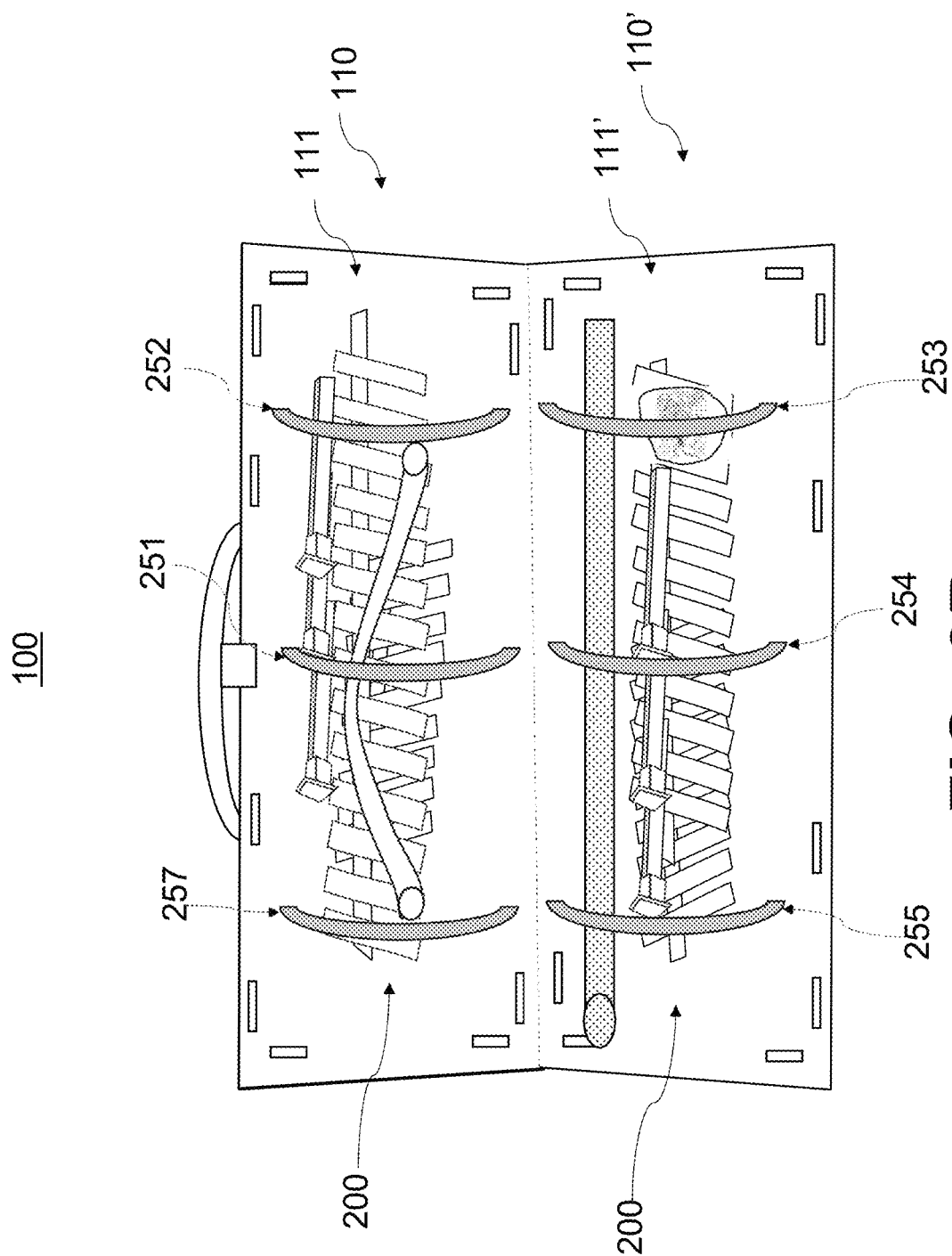
FIG. 3B is an illustrated view of storage of a kit on the top of the piddle patio shown in FIG. 3A.

The fence panels 120, 130, 140 are coupled to the bases 110, 110' into slots, shown in more detail in FIG. 3A and FIG. 3B. The fence panels 120, 130, 140 are configurable according to the plurality of slots to afford a desired size and shape of an interior area 150. The fence panels 120, 130, 140 are coupled to at least one of the posts 250 by at least one of a plurality of hinges 220 by one or more of a plurality of coupling devices 240, shown in FIG. 1B.

The fourth of the sides 116, 116' of the bases 110, 110' is shown configured against a back 901 of a house 900. In addition, the piddle patio 100 may include at least one plexiglass barrier 271 on the outer perimeter. The plexiglass barrier 271 may be configured to contain pet urine and serve as a barrier for entry. The piddle patio 100 may further include a slope configured to draw urine towards the drainage system. To accomplish this, the patio 100 may also include a plurality of stilts.

In FIG. 1B, an exemplary kit 200 for the piddle patio 100 is presented. Although the kit 200 is shown with the following accessories, this is just an example of those accessories, however other accessories are hereby contemplated.

The kit 200 has at least a gate 210, a plurality of hinges 220, a drain hose 230, a plurality of coupling devices 240, a plurality of posts 250 and a turf 260, a plurality of fencing slats 270 and a plurality of fence frames 120. The drain hose 230 is preferably made of a rubber or poly-vinyl chloride (PVC) material. The posts 250, fencing slates and fence frames 120 are preferably made of a poly-vinyl chloride (PVC) material, however other materials are hereby contemplated, including, but not limited to aluminum, bamboo, etc.

Each of the fence panels 120, 130, 140 are constructed by coupling one or more of the fencing slats 270 to one of the plurality of fence frames 120. The drain hose 230 may be coupled to the channel 105 of the piddle patio 100.

In FIG. 1C, one of the bases 110 is shown without the turf 260 coupled thereto. The baes 110 have the sides 113, 114, 115, 116. The other of the bases 110' is identical to that described for the base 110.

The base 110 has an interior 108. One or more grates 950 are coupled to a top 111 of the base 100. The grates 950 have a plurality of long frame pieces 955, 956, 957, a plurality of short frame pieces 958, 959, 960, 961, and a plurality of thin stability pieces. The long frame pieces 955, 956, 957 are coupled to the sides 113, 115 of the grates 950. The short frame pieces 958, 959, 960, 961 are coupled to the sides 114, 116. The plurality of thin stability pieces 962, 963 are coupled to the sides 113, 114, 115, 116 thereby providing strength and allowing runoff to collect in the interior 108 of the base 110.

The base 100 further has a drain plug 109. The drain plug 109 is useful for allowing the liquid to drain from the interior 108 of the base 110. The drain hose 230 may be coupled to the drain plug 109 to allow drainage of the liquid to a specific area or direction.

Figure 2:
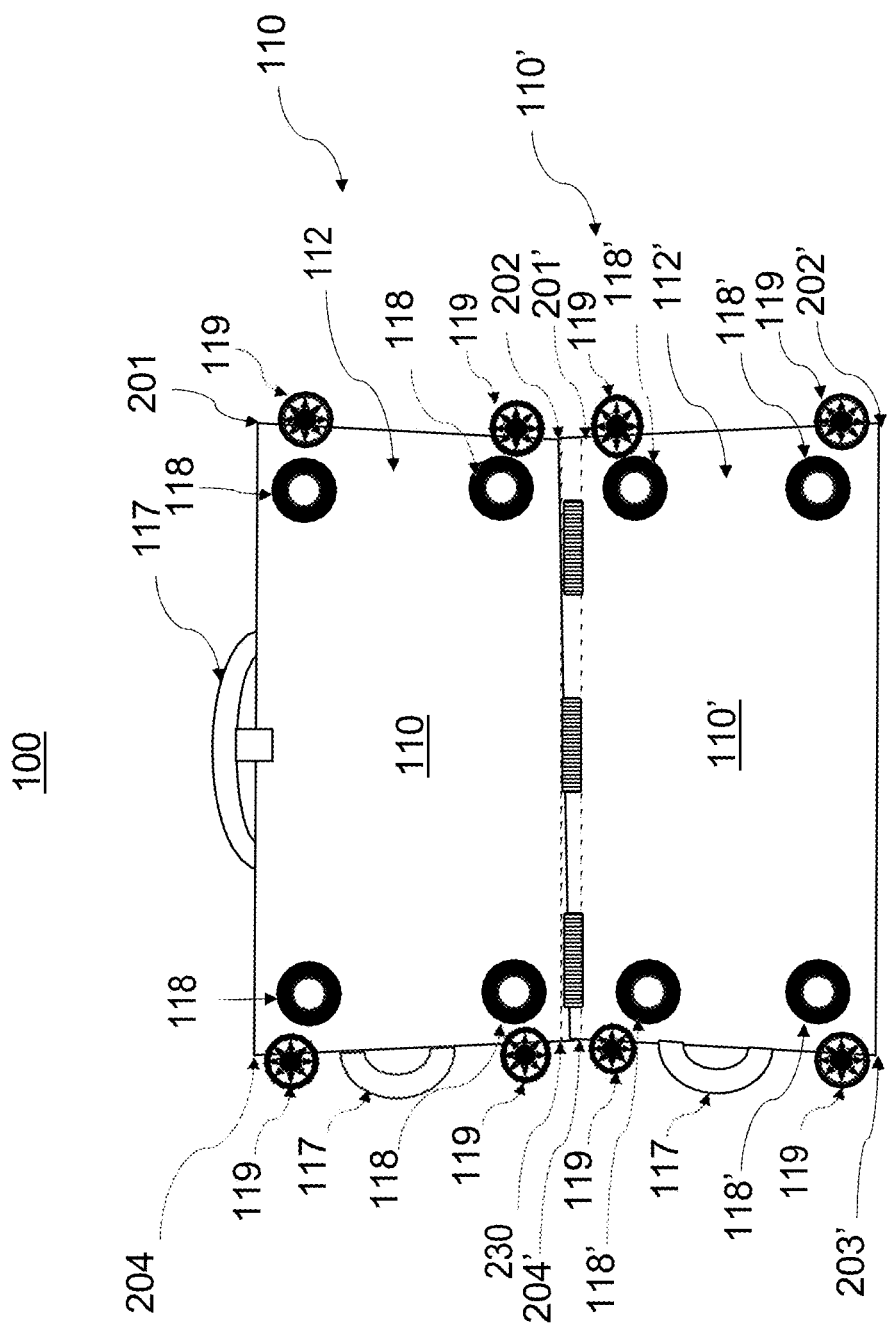
FIG. 2 is an illustrated view of a bottom of a piddle patio shown in FIG. 1A.

Moving now to FIG. 2, an illustrated view of the bottoms 112, 112' of a piddle patio 100 shown in FIG. 1A is presented. The bottom of the piddle patio 100 has the two bases 110, 110' coupled by one or more coupling devices 240 forming the channel 105 to allow liquid to flow out from the piddle patio 100. The coupling devices 240 are preferably hinges. Each of the bottoms 112, 112' have a plurality of corners 201, 202, 203, 204, 201', 202', 203', 204. Each of the footings 118, 118' is coupled to one of the corners 201, 202, 203, 204, 201', 202', 203', 204' of the bases 110, 110'.

The handles 117 are shown coupled to each of the bases 110, 110', however the handles 117 may be one or more in number and may be coupled to any of the sides 113, 114, 115, 116, 113', 114', 115' 116'.

A plurality of wheels 119 are coupled to the sides 113, 114, 115, 116, 113', 114', 115' 116' substantially near the corners 201, 202, 203, 204, 201', 202', 203', 204'. The wheels 199 provide easy transport of the piddle patio 100.

Referring now to FIG. 3A and FIG. 3B, an illustrated view of the top 111, 111' of the bases 110, 110' of the piddle patio 100 is presented.

The turf 260 is coupled to the top 111, 111' of the bases 110, 110' of the piddle patio 100. The top 111, 111' has a plurality of straps 257, 251, 252, 253, 254, 255. The straps 257, 251, 252, 253, 254, 255 are preferably equal distanced apart upon the top 111, 111' of each of bases 110, 110'. The straps 257, 251, 252, 253, 254, 255 are useful for storing the kit 200, shown in FIG. 1B, for portability and ease of transport.

The top 111, 111' of the bases 110, 110' further has a plurality of slots 260. The slots 260 are configured to be arranged in a manner that allows for the fence panels 120, 130, 140, shown in FIG. 1A to configure the interior area 150, shown in FIG. 1A, in different configurations and sizes.

Each of the posts 250 are coupled one of the slots 260 to configure the interior area 150. The fence panels 120, 130, 140 are then coupled to the posts 250 by one of the hinges 220. The fence panels 120, 130, 140 are further coupled to one or more of the slots 260 to secure the fence panels 120, 130, 140 to the bases 110, 110'.

In FIG. 3B, the kit 200 of the piddle patio 100 is shown secured by the straps 257, 251, 252, 253, 254, 255, 256.

Figure 4:
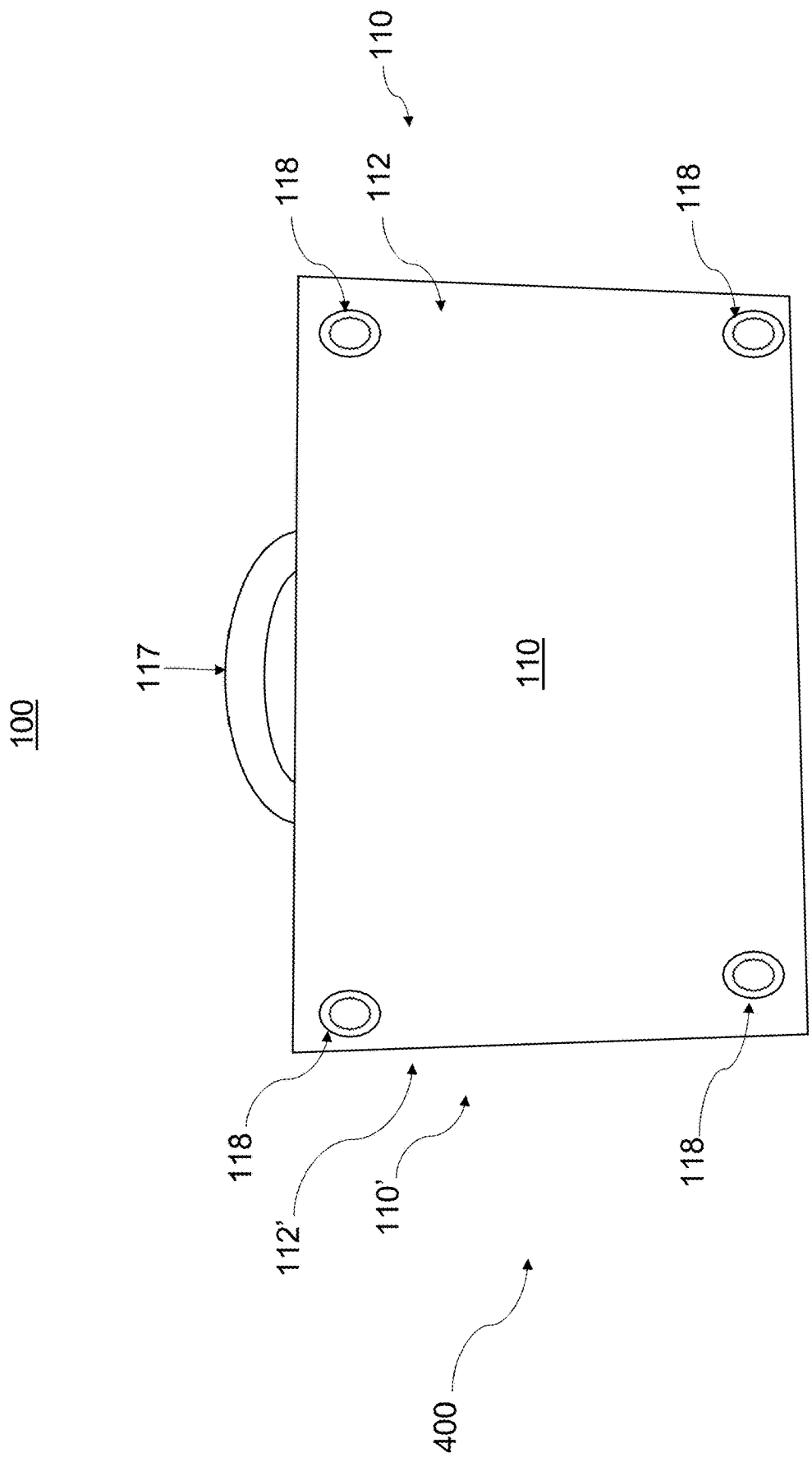
FIG. 4 is an illustrated view of a fully folded piddle patio as shown in FIG. 1A.

Finally referring to FIG. 4, the piddle patio is presented in a folded or portable configuration.

The first of the bases 110 is folded to the second of the bases 110', see FIG. 2, such that the bottom 112, 112' form a container 400. The container 400 allows to make portable and safe and secure storage of the piddle patio when not in use as well as protects and keeps in tact the components of the kit 200, shown in FIG. 3B. The footings 118 extend outward from the bottom 112 of the first of the bases 110. The handle 117 is accessible and securely coupled to the piddle patio 100 such that ease of movement of the piddle patio 100 is accomplished.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A patio for small pet elimination, the patio consisting of:
    two bases, each of the bases having a top, a bottom, a first side, a second side, a third side and a fourth side, the first side of a first of the bases being coupled to a third side of a second of the bases by one or more hinges thereby forming a channel;
    a gate, a plurality of coupling devices, a plurality of fence panels and a plurality of posts;
    at least one of the fence panels being coupled to at least one of the plurality of posts by the plurality of coupling device;
    a plurality of straps, the plurality of straps equidistantly coupled to the top of the first base and coupled to the top of the second base, the straps removably coupling a turf to the top of each of the bases;
    a handle, the handle being coupled to a second side of the first of the bases; and
    a plurality of slots, the plurality of slots being configured on each of the top of the first base and the top of the second base, wherein the posts and the fence panels being coupled to slots of the top of the first base and the top of the second base.

2. The patio of claim 1, wherein the one or more hinges being coupled to the post by the plurality of coupling device.

3. The patio of claim 2, wherein the coupling device is a screw.

4. The patio of claim 1, wherein the fence panel is configured to have one or more fencing slats being coupled to a fence frame by the coupling device.

5. The patio of claim 4, wherein the coupling device is a screw.

6. The patio of claim 1, wherein the patio is in an unfolded configuration.

7. The patio of claim 6, wherein the patio has a length of ninety-six inches.

8. The patio of claim 6, wherein the patio has a width of forty-eight inches.

9. The patio of claim 1, wherein the patio is in a folded configuration.

10. The patio of claim 1, wherein the patio having a length of forty-eight inches.

11. The patio of claim 1, wherein the patio having a width of forty-eight inches.

12. The patio of claim 1, wherein the patio is portable.

13. The patio of claim 1, wherein the fence panels are made of a poly-vinyl chloride (PVC) material.

* * * * *